United States Patent [19]

Pearson

[11] Patent Number: 4,580,747

[45] Date of Patent: Apr. 8, 1986

[54] METHOD AND APPARATUS FOR ORBITAL PLANE CHANGING

[76] Inventor: Jerome Pearson, 5491 Corkhill Dr., Dayton, Ohio 45424

[21] Appl. No.: 475,421

[22] Filed: Mar. 15, 1983

[51] Int. Cl.$^4$ ............................................. B64G 1/24
[52] U.S. Cl. ............................... 244/164; 244/158 R; 244/1 TD
[58] Field of Search ............... 244/1 TD, 158 R, 159, 244/160, 162, 164, 167, 171, 2, 3

[56] References Cited

U.S. PATENT DOCUMENTS

| | | | |
|---|---|---|---|
| 1,218,586 | 3/1917 | Steinmetz | 244/3 |
| 3,241,142 | 3/1966 | Raabe | 244/167 |
| 3,373,994 | 3/1968 | Woodward | 244/3 |
| 3,389,877 | 6/1968 | Huber et al. | 244/158 R |
| 3,560,912 | 2/1971 | Spink et al. | 244/3 |
| 3,582,016 | 6/1971 | Sherman | 244/167 |
| 3,613,626 | 10/1971 | Kelly et al. | 244/3 |
| 4,083,520 | 4/1978 | Rupp et al. | 244/167 |
| 4,097,010 | 6/1978 | Colombo et al. | 244/158 R |

OTHER PUBLICATIONS

B. K. Joosten and B. L. Pierson, *Minimum-Fuel Aerodynamic Plane Change Maneuvers*, AIAA Aerospace Sciences Meeting, Jan. 1981, AIAA paper 81-0187.

V. A. Chobotov, *Gravitationally Stabilized Satellite Solar Power Station In Orbit*, Journal of Spacecraft, vol. 14, No. 4, pp. 249-251, 1977.

J. Pearson, *Anchored Lunar Satellites for Cislunar Transportation and Communication*, Journal of the Aeronautical Sciences, vol. 27, No. 1, pp. 39-62, 1979.

Primary Examiner—Trygve M. Blix
Assistant Examiner—Rodney Corl
Attorney, Agent, or Firm—Biebel, French & Nauman

[57] ABSTRACT

A lifting body is suspended from a satellite by a long tether extending downwardly into the atmosphere of a planet about which the satellite is orbiting. The lifting body is oriented so as to provide a horizontal force upon the satellite through the tether tension, thereby changing the orbital plane of the satellite. The tether is wound on a reel in the satellite, which may be the NASA Space Shuttle, and the lifting body may be repeatedly deployed and retrieved. The lifting body is provided with remotely controlled aerodynamic surfaces to control its angle of attack.

13 Claims, 10 Drawing Figures

METHOD AND APPARATUS FOR ORBITAL PLANE CHANGING

BACKGROUND OF THE INVENTION

This invention is related to the field of space technology, and, in particular, to a spacecraft configuration.

Prior Art

Since the first earth satellite was orbited in 1957, there has been an increasing use of many different kinds of satellites in earth orbit to perform a variety of tasks. For some of these tasks, such as world-wide communications, the satellite must be in an equatorial orbit with a period of one day, so as to appear fixed over a point on the equator. For other tasks, it is desirable to have the satellite in polar orbit, so as to pass over every part of the earth. For manned satellites and other uses, orbits of intermediate inclination to the equator are desired. For example, the orbit that requires minimum fuel to reach from a given launch point has an inclination equal to the latitude of the launch point. As a result, there are hundreds of satellites now in earth orbit, with inclinations to the equator ranging from zero to more than 90 degrees (retrograde).

With the advent of the reusable Space Shuttle, it has become possible for one spacecraft to launch or retrieve many satellites on a single mission. This means that the Shuttle must change its orbital inclination before each deployment or retrieval of a satellite, in order to match the satellite orbit. Unfortunately, changing the inclination of a spacecraft orbit is very expensive in energy. For example, the total velocity change required to launch a satellite into a minimum energy orbit from Cape Canaveral is about 8 km per second. For a polar orbit, the requirement is about 9 km per second, because the additional velocity of the earth's rotation cannot be used.

However, to change the spacecraft orbital inclination from equatorial to polar once it is in orbit requires a total velocity change of 12 km per second. This is such a severe requirement that it is easier to land and start all over again than to change the velocity while the spacecraft is in orbit. Small orbital inclination changes can be achieved using much less velocity change, but it is still a very difficult operation. No spacecraft has yet changed its orbital inclination by more than one or two degrees.

An aerodynamic vehicle such as the Space Shuttle can use the atmosphere to assist itself in changing orbital planes, by using rocket thrust to lower its orbit, dipping into the atmosphere, banking to provide a horizontal lift force, then using rocket thrust again to raise its orbit back to the former value, in the new plane. This maneuver is called the "synergetic plane change", and it was developed by the United States Air Force in the 1960's during the Dynasoar program (B. K. Joosten and B. L. Pierson, Minimum-Fuel Aerodynamic Plane Change Maneuvers, AIAA Aerospace Sciences Meeting, January 1981 AIAA Paper 81-0187).

In addition to single satellites in various earth orbits, there have been suggested techniques for tethering two satellites by means of a long wire or cable. This would allow two satellites to rotate at the ends of the tether, providing artificial gravity for human habitation. Longer tethers have been proposed to maintain a satellite in a synchronous orbit, but lower than the normal 35,800 kilometer radius, by hanging it at the end of a tether hundreds or thousands of kilometers long. These long-tethered satellites would be stabilized along the local vertical by the gravity gradient (V. A. Chobotov, Gravitationally Stabilized Satellite Solar Power Station in Orbit, Journal of Spacecraft, Vol. 14, No. 4, pp. 249-251, 1977). It has also been proposed that satellites be attached to the earth and moon by tethers (J. Pearson, Anchored Lunar Satellites for Cislunar Transportation and Communication, Journal of the Aeronautical Sciences, Vol. 27, No. 1, pp. 39-62, 1979). Another proposal suggests the tethering of subsatellites up to 110 km below the Space Shuttle for scientific measurements at an otherwise inaccessible altitude (Colombo et al U.S. Pat. No. 4,097,010). Rupp et al U.S. Pat. No. 4,083,520 teaches the dynamics of tether and satellite motions and discloses a mechanism for deploying and retrieving a tether.

SUMMARY OF THE INVENTION

In accordance with this invention a satellite is provided with a tethered lifting body suspended in the atmosphere. The lifting body is oriented so as to provide a horizontal force upon the satellite, thereby changing the orbital plane of the satellite. The tether is wound on a reel and may be repeatedly deployed and retrieved. Control means are provided for controlling the horizontal force upon the satellite by adjusting the angle of attack of the lifting body.

It is therefore an object of this invention to provide improved apparatus and method for adjusting the orbital plane of an artificial satellite.

It is another object of this invention to provide remotely controlled aerodynamic surfaces on a satellite-tethered lifting body to maintain a specified, adjustable angle of attack.

Other objects and advantages of the invention will be apparent from the following description, the accompanying drawings and the appended claims.

BRIEF DESCRIPTION OF THE DRAWINGS

Figure 1:
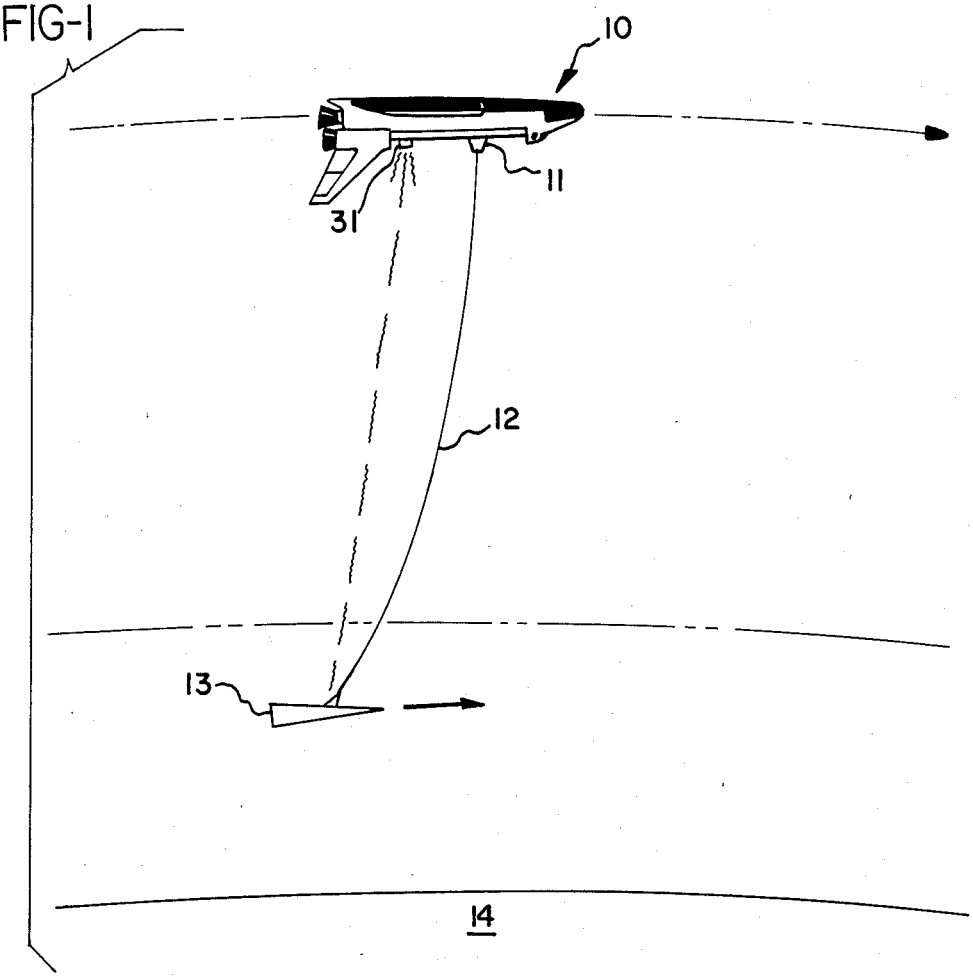
FIG. 1 is a schematic diagram of a typical configuration of a satellite-tethered lifting body.

In FIG. 1 the basic configuration of the invention is shown. A satellite 10, shown here as the Space Shuttle, is in low orbit, about 200 km above the earth 14, and above the sensible atmosphere to the extent that aerodynamic drag is negligible. A lifting body 13 is deployed downward from the satellite by a long tether 12 and reel mechanism 11, and is stabilized by the gravity gradient. The airfoil is lowered into the upper reaches of the atmosphere, until the aerodynamic forces are sufficient to provide a force as hereinafter described.

There are four forces acting on the lifting body—the gravity-gradient force, the aerodynamic lift force, the aerodynamic drag force and the tether force. The resultant of the first three forces determines the tension in the tether. The angle of attack of the airfoil, and thus the aerodynamic forces, can be controlled remotely from the satellite by means of radio signals from transmitter 31, or by a pre-programmed controller on board the lifting body.

Figure 2:
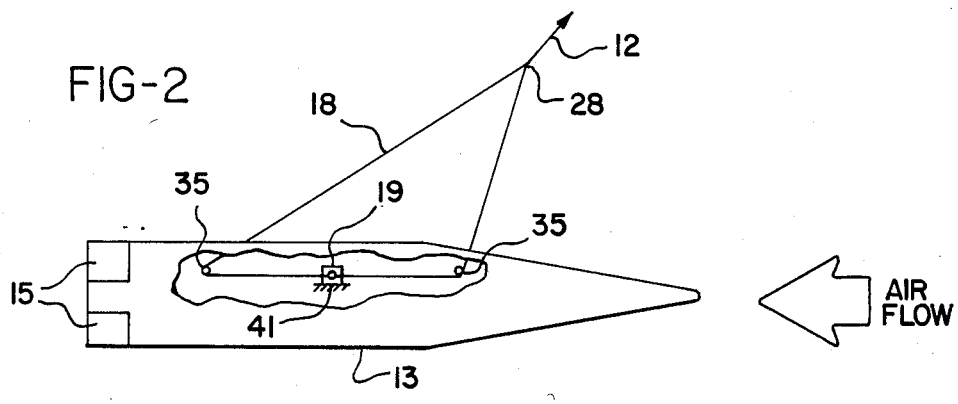
FIG. 2 is a schematic diagram of a first configuration for the lifting body of FIG. 1.
Figure 3:
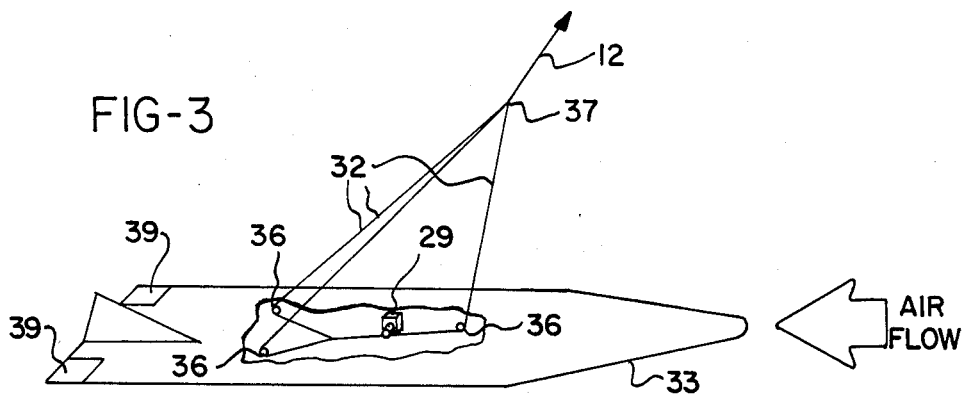
FIG. 3 is a schematic diagram of a second configuration for the lifting body of FIG. 1.

In FIGS. 2 and 3 the lifting body is shown in two configurations, permitting two possible orientations. In the first orientation, as shown in FIG. 2, the aerodynamic lift on lifting body 13 provides a component of force at right angles to the satellite orbital path, resulting in a precession of the orbital axis and a resultant change in inclination. In the second orientation, as shown in FIG. 3, the aerodynamic lift on lifting body 33 (alternative configuration) provides a force directed upwardly toward the satellite. This cancels some of the gravity-gradient force downward on the satellite, and allows the lifting body to be used for a variety of aerodynamic investigations without unduly lowering the orbit of the satellite.

In the configuration of FIG. 2 the tether 12 is connected to the lifting 13 by a two-point suspension arrangement comprising a suspension line 18 wrapped around a pair of rollers 35, 35 and around a spindle 41 which is driven by a motor 19. Suspension line 18 is joined to tether 12 at a joint 28. This enables pitch control so as to adjust the center of gravity and the center of pressure. A motor 19 adjusts the suspension point by rotating spindle 41 to move the joint 28 fore and aft. A pair of flaps 15, 15 are provided for controlling the angle of attack of the lifting body. The forces on the lifting body are relatively small, and an extremely fine tether with a diameter on the order of a few tenths of a millimeter may be used. Reference may be made to Colombo et al U.S. Pat. No. 4,097,010 for background information regarding the selection of materials for a suitable tether. The tether cross section may be aerodynamically shaped for reduction of drag.

In the alternate configuration of FIG. 3 lifting body 33 has a suspension arrangement comprising three suspension lines 32, 32, 32 wrapped around three attachment rollers 36, 36, 36, an upper joint 37 and a lower joint 38. Rollers 36 are positioned about the aerodynamic center of lifting body 33. In this configuration the pitch is controlled by a motor 29, which again adjusts the suspension point fore and aft. A pair of flaps 39, 39 are controlled for cooperation with motor 29. In this configuration, the airfoil need not be symmetric.

Figure 4:
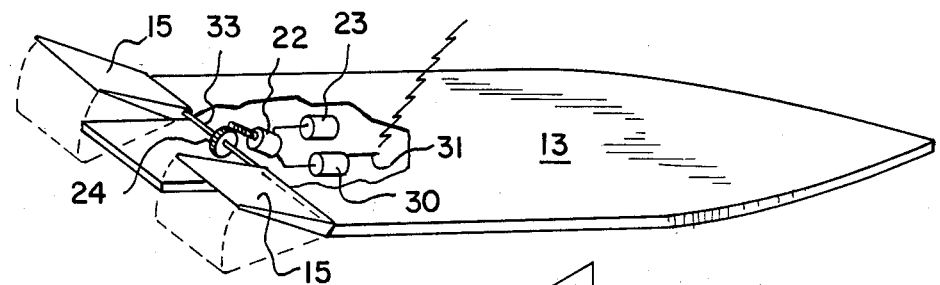
FIG. 4 is a schematic diagram of apparatus for controlling the angle of attack of a lifting body.

In FIG. 4 are shown the details of mechanism for controlling flaps 15, 15 to change the lifting body angle of attack and thereby cause precession of the plane of the satellite orbit. The mechanism comprises a worm 21 and gear 24, a drive motor 22, a power supply 23, and a controller 30. The flap angle may be varied either by a program stored in the controller or by radio signals from satellite 10. An antenna 31 is provided for receiving such signals and supplying them to an S-band receiver within controller 30.

For use with the NASA Space Shuttle, lifting body 13 may have a highly swept back configuration. A typical lifting body may be of bolted, two-section construction and have a surface area of 100 square meters. The overall length may be 27 m, with a maximum width of 5 m and a maximum thickness of 15 cm. The half-angle of the nose may be 10 degrees. The thickness-chord and edge radius-chord ratios can be minimized, because there is no need for significant internal volume or great stiffness.

Table I summarizes typical design parameters for a lifting body of the above described type. The lifting body may comprise a graphite/epoxy composite structure with a central spar, edge tubes, integral stiffeners, and laminated skin. The skin may be in typical 0/45/90 ply orientation for highest isotropic strength. The entire surface of the body, including the control surfaces, may be covered with 2 cm of Space Shuttle sliica tile heat insulation, type LRSI. The total mass of the lifting body, including the controls, electronics, and motors is estimated to be 1500 kg. Such a lifting body, lowered to 93 km altitude, will precess the Shuttle orbit by 1.5 degress per day.

TABLE I
DESIGN PARAMETERS FOR A TETHERED LIFTING BODY

| | |
|---|---|
| Satellite Mass (Space Shuttle) | 70,000 kg |
| Satellite Orbit Radius | 6563 km |
| Precession Rate | 1.5 deg/day |
| Lifting Body Orbit Radius | 6471 km |
| Tether Length | 92-109 km |
| Tether Angle ($\lambda_1$) | 9-27 deg |
| Orbital Period | 88 min |
| Lifting Body Area | 100 sq m |
| Lifting Body Structural Mass | 700 kg |
| Lifting Body Insulation Mass | 627 kg |
| Lifting Body Equipment Mass | 173 kg |
| Lifting Body Total Mass | 1500 kg |
| Lower Tether Mass, A-286 Hi-Temp Alloy | 364 kg |
| Upper Tether Mass, 302 Stainless Steel | 535 kg |
| Lower Tether Diameter | 1.72 mm |
| Upper Tether Diameter | 0.99 mm |
| Maximum Angle of Attack | 10 deg |
| Maximum Lift Force | 329 N |
| Maximum Drag Force (Including Tether) | 110 N |
| Lift/Drag | 3.0 |
| Lifting Body Operating Dynamic Pressure Q | 54.4 N/sq m |

Figure 5:
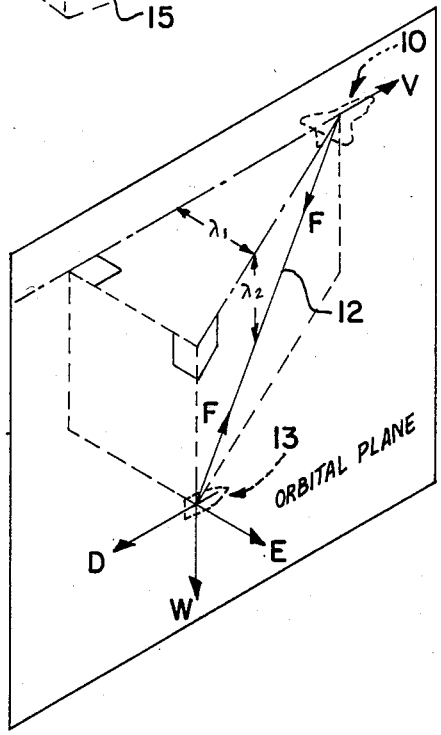
FIG. 5 is a schematic diagram illustrating the forces acting on a lifting body and the resulting tether angle components.

FIG. 5 illustrates the forces acting upon a lifting body 13 attached to a satellite 10 by a tether 12. For purposes of simplification, tether 12 is illustrated as extending along a straight line from lifting body 13 to satellite 10; the catenary curvature being ignored. As shown in the figure, tether 12 extends along a line having a first projected angular component $\lambda_1$, as measured in a horizontal plane which intersects the orbital plane of satellite 10 along a line coinciding with velocity vector V. There is a second projected angular component $\lambda_2$, which is measured in the vertical plane containing the tether.

As shown in FIG. 5, the aerodynamic forces acting on lifting body 13 may be resolved into a lift force E perpendicular to the orbital plane, a drag force D acting opposite to the velocity vector V, a gravity gradient force W, and a tether force F. The tether force is, of course, equal and opposite to the vector resultant of D, E and W. The angles $\lambda_1$ and $\lambda_2$ are given by equations:

$$\lambda_1 = \tan^{-1}\left(\frac{E}{D}\right)$$

$$\lambda_2 = \tan^{-1}\left(\frac{W \cos \lambda_1}{D}\right)$$

$$= \tan^{-1}\left[\frac{W \cos \tan^{-1} E/D}{D}\right]$$

The tether force F is given by the usual relation:

$$F = \sqrt{D^2 + E^2 + W^2}$$

or alternatively by:

$$F = \frac{W}{\sin \lambda_2}$$

For a nominal Shuttle orbit of 185 km altitude and a nominal lifting body altitude of 93 km, the gravity gradient produces an effective gravitational force on the lifting body of about 0.04 times the gravitational force at the surface of the earth, or about 592 newtons.

The aerodynamic lifting force experienced by the lifting body of the above example can be calculated by using newtonian momentum theory. Utilizing a dynamic pressure of 54.4 newtons per square meters, a lift coefficient of 0.05961 and a lifting area of 100 square meters, the total lifting force is found to be about 329 newtons.

The aerodynamic drag force includes components due to tether drag as well as lifting body drag. At an angle of attack of 10 degrees, the drag force on the lifting body is typically about 0.3125 times the lifting force, including the effects of skin friction and profile drag, as well as the drag due to lift. It is estimated that the tether drag may increase the total drag to about ⅓ the lifting force or approximately 100 newtons.

Figure 6:
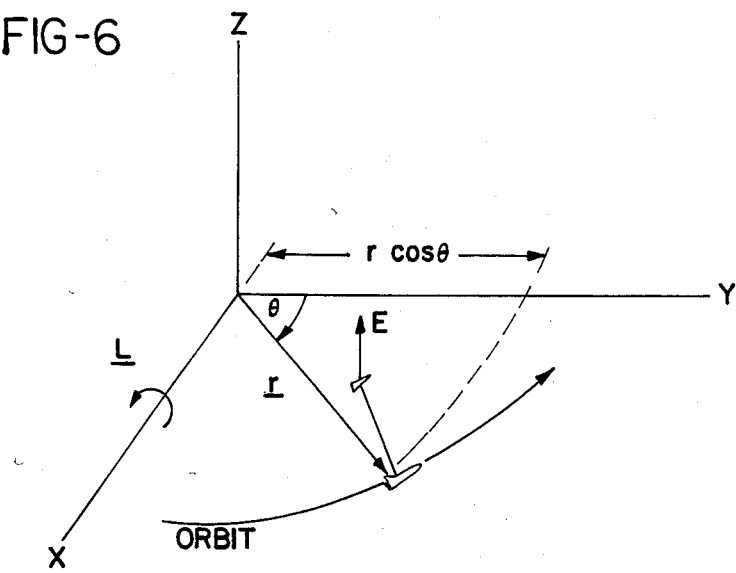
FIG. 6 is a diagram illustrating the geometry of a precession force applied to a satellite by a tethered lifting body.

FIG. 6 illustrates the geometry of the orbital motion of satellite 10 and lifting body 13. The motion is illustrated relative to a coordinate system attached to the orbital plane of the satellite. The lift force E on lifting body 13 is transmitted by tether 12 (as a component of tether force F) to satellite 10. This force creates a torque L around the X axis, which causes precession about the Y axis in accordance with the well known equation:

$$\Omega = \frac{L}{I\omega}$$

where:
$\Omega$=precession rate
$\omega$=angular spin rate
I=angular moment of inertia The torque L about the X axis is given by the equation:

$$L = Er \cos \theta$$

where:
$\theta$=position angle relative to Y axis
r=distance to the center of the earth It will be noted that a similar equation may be written to describe the precession rate about the X axis. However, as hereinafter described, the lift force E is adjusted as a function of the position angle $\theta$ to produce a net precession of zero about the X axis. This results in a controlled precession of the orbital plane about the Y axis alone.

In accordance with the invention the following control equation is used:

$$E = E_{max} \cos \theta$$

So $$L = E_{max} r \cos^2 \theta$$

Therefore, the instantaneous precession rate is given by $$\Omega = \frac{E_{max} r \cos^2 \theta}{I\omega}$$

$$= \frac{E_{max} \cos^2 \theta}{mr\omega}$$

and the total angular precession during one orbital period T is given by:

$$\gamma = \frac{4 E_{max}}{mr\omega} \int_{t=0}^{T/4} \cos^2 \theta \, dt$$

which can be evaluated to give $$\gamma = \frac{\pi E_{max}}{mr\omega^2}$$

Then since the average precession rate is given by:

$$\Omega_{Av} = \frac{\gamma}{T}$$

It will be seen that $$\Omega_{Av} = \frac{E_{max} T}{4\pi mr} = \frac{E_{max}}{2mr\omega}$$

which for the above example produces an average precession rate of approximtely 1.5 deg. per day. This is net precession about the Y axis.

The average torque about the X axis is given by the equation:

$$L_{Av} = \Omega_{Av} I\omega = \frac{E_{max} r}{2}$$

By a similar analysis it may be shown that the net precession about the X axis and the average torque about the Y axis are both zero.

It will be readily apparent that other control laws could be used. The only requirement is that the control law produce a net precession about the coordinate axis of interest. Preferably, the control law should also produce a zero average torque about that axis in order to avoid nutation of the orbit. For example, the controller could adjust the flap angle between maximum positive and negative positions such that $E=E_{max}$ for $0<\theta<180°$ and $E=-E_{max}$ for $180°<\theta<360°$.

Figure 7:
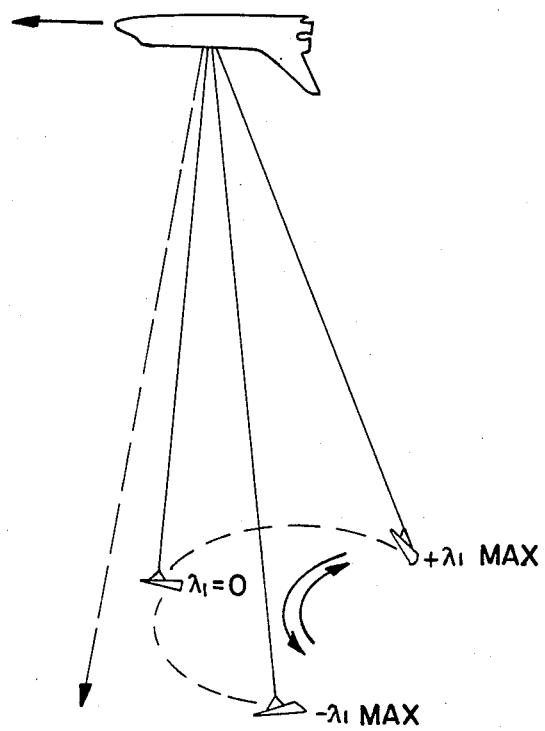
FIG. 7 is a schematic diagram of the geometry of tethered lifting body movement relative to a parent satellite during the course of a complete earth orbit.

FIG. 7 is a schematic diagram of lifting body movement relative to the Shuttle as the lifting force E is varied in accordance with the preferred control law. It will be seen that the lifting body follows a circular arc, swinging from the starboard to the port side of the Shuttle and back again each orbit. Such circular movement can be verified by substituting the control law equation:

$$E=E_{max} \cos \theta$$

into the equations for the tether angles $\lambda_1$ and $\lambda_2$.

Since E is proportional to the flap deflection angle $\delta$, the flap control equation is:

$$\delta=\delta_{max} \cos \theta$$

By mechanizing such an equation the lifting body is readily swung to the tether angle associated with the desired lift. It may be noted that a complete flap cycle from positive to negative extends for a period of more than an hour. Therefore it is feasible to use relatively slow, low force flap actuators.

Figure 8:
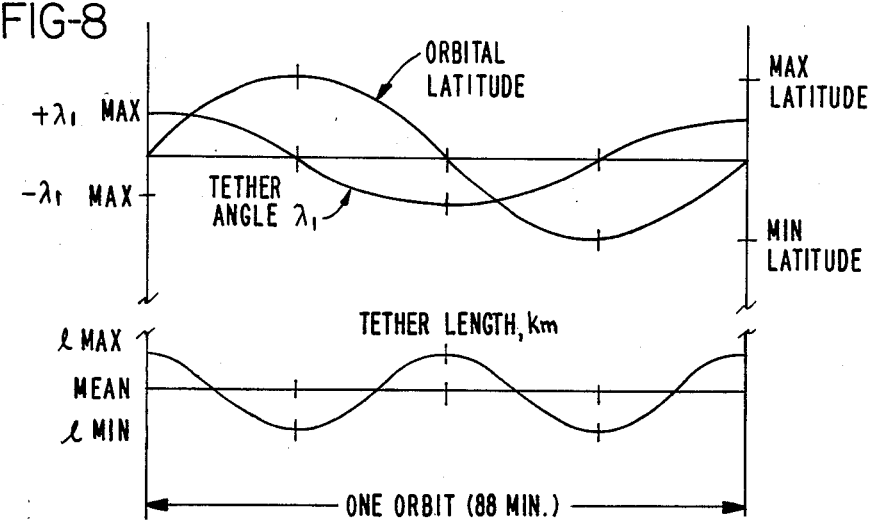
FIG. 8 is a graph showing the required tether angle and the required tether length as a function of orbital latitude.

FIG. 8 presents a plot showing the required angle of attack as a function of the orbital position of the satellite. It will be seen that the angle of attack has a maximum positive value (thereby causing a maximum northward tether angle) as the satellite crosses the equator heading north and a maximum negative value as the satellite crosses the equator heading south. Because of the changing angle of the tether (from 9 to 27 degrees, as shown in Table I), the tether length must be varied cyclically over each orbit from 100.5 to 123.8 km to keep the lifting body at a constant altitude. With an orbital period of 88 minutes, the maximum tether length rate of change is 27.7 m/s. With a more powerful winch motor, higher rates of tether length change could be used to raise the lifting body to a higher altitude during the zero lift portion of its flight. This would reduce the drag and improve the overall efficiency. It would also allow additional cooling of the vehicle and tether, making possible higher Q operations with the same amount of thermal protection. For a sail altitude of 93 km, an orbital period of 88 minutes, and a lift force of 329 N., the maximum lateral excursion of the lifting body on the end of the tether is 52 km, corresponding to a tether lateral angle of 28 degrees. The maximum lateral velocity is then 62 m/sec. This amounts to only a small perturbation on the nominal airspeed of 7 km/sec for the airfoil.

Figure 9:
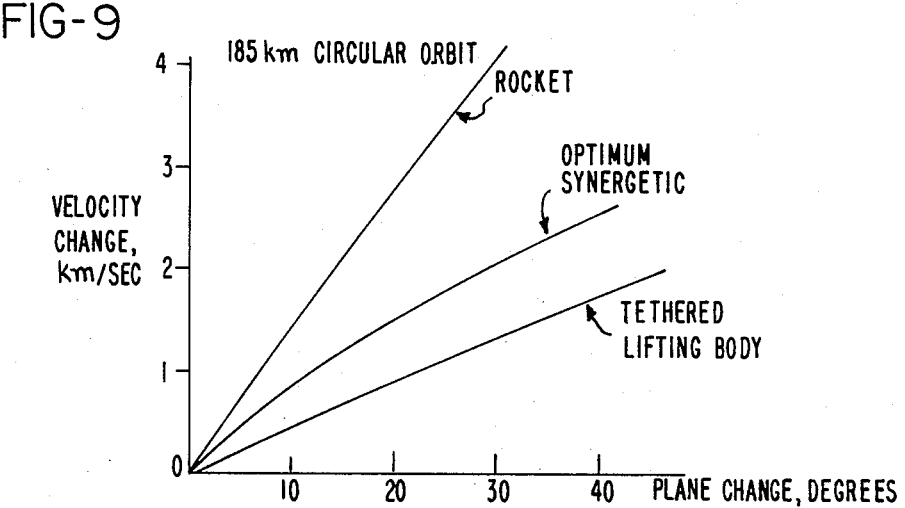
FIG. 9 is a graph showing the required velocity changes for various orbital plane changes.

FIG. 9 shows a comparision of the required velocity change, in km/sec, to change the orbital plane of the Space Shuttle, using rocket propulsion, using the optimum synergetic aerodynamic maneuver (Joosten and Pierson, 1981), and using a tethered lifting body with a lift/drag ratio of three. In the all-propulsive orbital plane change maneuver, the satellite rockets are fired to provide a thrust at right angles to the current orbital velocity. The maneuver is quick, but very costly in fuel because of the high velocity change required. For low orbits, this is a very high velocity.

The optimum synergetic maneuver requires that the Shuttle fire rockets to lower its orbit into the upper atmosphere, then perform an aerodynamic maneuver to provide a side force, then fire rockets to return to the initial orbit. This maneuver is limited in efficiency by the lift-to-drag ratio of the Space Shuttle, which is not optimized for this function, and by the fact that the heavy Shuttle must first be lowered and then raised against gravity.

The use of the tethered lifting body is somewhat slower, but it is the most efficient of the three techniques. There is no need to de-orbit the Shuttle into the upper atmosphere, and the lifting body can be designed to provide optimum lift/drag for its chosen operating altitude. Rockets are used to make up for the energy lost to the drag of the lifting body and tether, which should be much less than that of the entire Shuttle vehicle.

Figure 10:
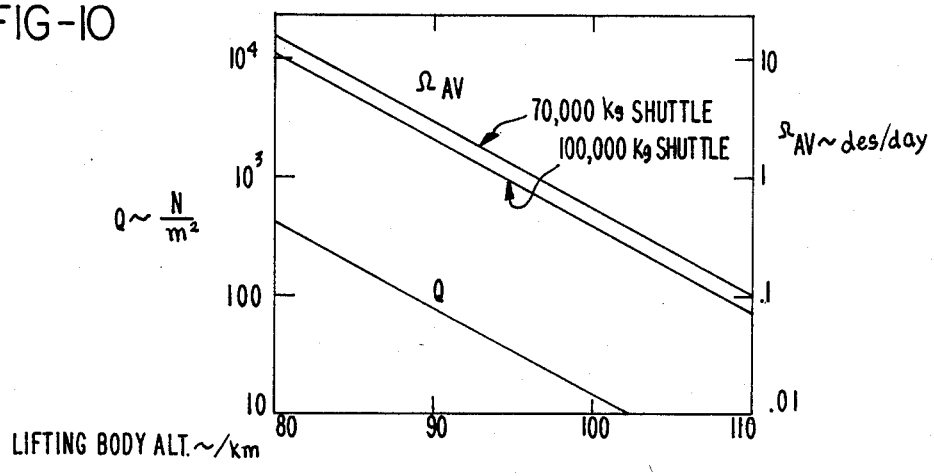
FIG. 10 is a graphical plot showing dynamic pressure on a tethered lifting body having an area of 100 square meters and the resulting precession rate for a parent Space Shuttle.

FIG. 10 shows the average precession rate for the Shuttle and the average dynamic pressure on the lifting body, both as a function of lifting body altitude. For this plot the lifting body area is assumed to be 100 square meters and the Shuttle altitude is assumed to be 185 km. Plots are presented for a 70,000 kg Shuttle and for a 100,000 kg Shuttle. The precession rate is shown to increase greatly as the lifting body is extended to lower altitudes, but the problems of aerodynamic heating are increased. The larger values of Q require higher temperature materials for the leading edge of the airfoil, such as the HRSI silica tiles used on the Space Shuttle for temperatures up to 1500K. The precession rate may also be increased by simply increasing the area of the airfoil. Multiple-folding, deployable or inflatable structures may be used for such purposes.

A satellite-tethered lifting body, as described above, may also be used as an experimental device for gaining fundamental knowledge of the flight conditions at about 100 km altitude and Mach 25. A variety of airfoils or lifting bodies may be instrumented and controlled to provide data over different angles of attack, atmospheric densities, and relative velocities. The regime of operation may encompass extremely long mean free paths for the air molecules and would allow new fundamental aerodynamic data to be obtained. In this mode of operation the lift vector would be oriented vertically, so as to provide an upward force on the satellite. This force would counteract some of the drag force tending to lower the satellite orbit.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. Method of changing the orbital plane of an orbiting satellite comprising the steps of positioning a lifting body within the atmosphere below said satellite upon a tether attached at its one end to said lifting body and at its other end to said satellite, adjusting the angle of attack of said lifting body to create in said tether a tension force having a component perpendicular to said orbital plane, and modifying said angle of attack during orbital motion of said satellite to produce a net overage torque about an axis fixed in said orbital plane.

2. Method according to claim 1 wherein said angle of attack is adjusted during orbital motion of said satellite to produce a zero average torque about an axis in said orbital plane which is perpendicular to said first mentioned axis.

3. Method according to claim 2 wherein the angle of attack of said lifting body is adjusted by adjusting the positioning angle of at least one aerodynamic surface attached to said lifing body.

4. Method according to claim 3 wherein said positioning angle is adjusted in accordance with the equation:

$$\delta = \delta_{max} \cos \theta$$

the following notation being employed;

$\delta$ = positioning angle
$\delta_{max}$ = maximum value of positioning angle
$\theta$ = orbit angle between the satellite position and said first named axis.

5. Method according to any of claims 1–4 wherein said positioning step includes the step of lowering said lifting body from said satellite.

6. Apparatus for changing the orbital plane of an orbiting satellite comprising:
   (a) a tether for trailing downwardly from said satellite,
   (b) a lifting body attached to said tether, and
   (c) adjustment means for adjusting the angle of attack of said lifting body to create in said tether a tension force which has a component perpendicular to said orbital plane and which alternates in direction during different portions of the orbital period.

7. Apparatus according to claim 6 wherein said adjustment means comprises at least one aerodynamic flap on said lifting body and positioning means for adjusting the positioning angle of said flap.

8. Apparatus according to claim 6 wherein said tether is attached to said lifting body by suspension means comprising a joint terminating said tether, a plurality of attachment devices mounted on said lifting body and at least one suspension line extending between said joint and said attachment devices.

9. Apparatus according to claim 8 wherein said adjustment means comprises means for producing relative movement of said suspension line and causing fore and aft movement of said joint relative to said body.

10. Apparatus according to claim 9 wherein said attachment devices comprise at least one roller about which said suspension line is wrapped.

11. Apparatus according to claim 10 wherein said adjustment means further comprises a spindle and a motor for rotating said spindle; said attachment line being wrapped around said spindle.

12. Apparatus according to claim 11 wherein said adjustment means further comprises at least one aerodynamic flap on said lifting body and positioning means for adjusting the positioning angle of said flap.

13. Apparatus according to either of claims 11 or 12 wherein said suspension means comprises three of said rollers spaced around the aerodynamic center of said lifting body.

* * * * *